United States Patent
Kamimura et al.

(10) Patent No.: US 12,076,968 B2
(45) Date of Patent: Sep. 3, 2024

(54) SANDWICH PANEL MOLDING METHOD

(71) Applicant: The Yokohama Rubber Co., LTD., Kanagawa (JP)

(72) Inventors: Yukihiro Kamimura, Kanagawa (JP); Tomohiro Ito, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/546,030

(22) PCT Filed: Oct. 11, 2021

(86) PCT No.: PCT/JP2021/037513
§ 371 (c)(1),
(2) Date: Aug. 10, 2023

(87) PCT Pub. No.: WO2022/176261
PCT Pub. Date: Aug. 25, 2022

(65) Prior Publication Data
US 2024/0034045 A1 Feb. 1, 2024

(30) Foreign Application Priority Data
Feb. 16, 2021 (JP) .................. 2021-022230

(51) Int. Cl.
*B32B 37/14* (2006.01)
*B32B 5/18* (2006.01)
(Continued)

(52) U.S. Cl.
CPC .............. *B32B 37/144* (2013.01); *B32B 5/18* (2013.01); *B32B 7/10* (2013.01); *B32B 7/12* (2013.01);
(Continued)

(58) Field of Classification Search
CPC ......... B32B 37/144; B32B 37/06; B32B 5/18; B32B 7/10; B32B 7/12; B32B 27/08;
(Continued)

(56) References Cited

U.S. PATENT DOCUMENTS 6,090,729 A    7/2000  Jonas

FOREIGN PATENT DOCUMENTS

JP    2003-012889 A    1/2003
JP    2003-105109 A    4/2003
(Continued)

OTHER PUBLICATIONS

Gromax "O-CRESOL Novolac Epoxy Resin" from gromaxchemical.com as captured by archive.org Sep. 9, 2016.*
(Continued)

*Primary Examiner* — John L Goff, II
(74) *Attorney, Agent, or Firm* — Thorpe North & Western (57) ABSTRACT

A method of molding a sandwich panel includes a step of providing, on one or both surfaces of an (a) core material, a prepreg or the prepreg and an adhesive as a (b) skin material. The (a) core material is a super engineering plastic foam having a glass transition temperature of greater than 200° C. The (b) skin material contains: a (b-1) epoxy resin having an average molecular weight of 1300 or more or having a trishydroxymethane-type or cresol novolac-type structure and containing, in a total epoxy resin, an amount of 70 to 100 mass % of an epoxy resin that is semi-solid or solid; a (b-2) epoxy resin containing, in the total epoxy resin, an amount of 0 to 30 mass % of an epoxy resin that is liquid; and a (b-3) curing agent.

9 Claims, 1 Drawing Sheet

(51) Int. Cl.
  *B32B 7/10* (2006.01)
  *B32B 7/12* (2006.01)
  *B32B 27/08* (2006.01)
  *B32B 27/28* (2006.01)
  *B32B 27/38* (2006.01)
  *B32B 37/06* (2006.01)

(52) U.S. Cl.
  CPC ............ *B32B 27/08* (2013.01); *B32B 27/286* (2013.01); *B32B 27/38* (2013.01); *B32B 37/06* (2013.01); *B32B 2250/02* (2013.01); *B32B 2250/24* (2013.01); *B32B 2266/0214* (2013.01); *B32B 2307/30* (2013.01); *B32B 2307/72* (2013.01); *B32B 2307/736* (2013.01)

(58) Field of Classification Search
  CPC ... B32B 27/286; B32B 27/38; B32B 2250/02; B32B 2250/24; B32B 2266/0214; B32B 2307/30; B32B 2307/72; B32B 2307/736; B29C 70/026
  USPC ... 156/78, 307.1, 307.3, 307.4, 307.5, 307.7
  See application file for complete search history.

(56) References Cited

FOREIGN PATENT DOCUMENTS

| | | | |
|---|---|---|---|
| JP | 2006-002869 | A | 1/2006 |
| JP | 2011-099094 | A | 5/2011 |
| JP | 2016-169381 | A | 9/2016 |
| JP | 2019-001004 | A | 1/2019 |
| WO | 2016/159147 | A1 | 10/2016 |
| WO | WO 2020/214871 | A1 | 10/2020 |

OTHER PUBLICATIONS

Huntsman Araldite® MY 720 Resin Advanced Materials Technical Datasheet [retrieved from internet on Oct. 24, 2023] <URL: https://azelisamericascase.com/wp-content/uploads/2020/03/Araldite-MY-720.pdf>.

Huntsman Araldite® MY 721 Resin Advanced Materials Technical Datasheet [retrieved from internet on Oct. 24, 2023] <URL: https://azelisamericascase.com/wp-content/uploads/2020/03/Araldite-MY-721.pdf>.

* cited by examiner

SANDWICH PANEL MOLDING METHOD

TECHNICAL FIELD

The present technology relates to a method of molding a sandwich panel and particularly relates to a method of molding a sandwich panel that can reduce a change in thickness before and after curing.

BACKGROUND ART

A known fiber-reinforced composite material (FRP) uses a thermosetting resin such as an epoxy resin as a matrix. For example, Japan Unexamined Patent Publication No. 2011-99094 A discloses an epoxy resin composition containing an epoxy resin as a matrix, a thermoplastic resin for viscosity adjustment, a filler, and a curing agent and also discloses a prepreg obtained by combining the composition and a reinforcing fiber. Such a prepreg is used, because of its lightweight properties and excellent mechanical properties, in a wide range of fields including structural materials for aircrafts, vehicles, or the like, reinforcement of concrete structures, and sports fields such as golf clubs, tennis rackets, and fishing rods.

As a fiber-reinforced composite material to be applied to aircrafts or the like, not only an individual piece obtained by laminating and curing the prepreg described above but also an individual piece having a sandwich structure including a thin FRP used as a surface material (skin material) and a honeycomb core or a resin foam used as a core material is often applied. In this case, heat resistance of a product depends on a material of either the skin material or the core material having lower heat resistance. When, in particular, the heat resistance needs to exceed 150° C., the materials applicable to both the skin material and the core material have restrictions.

On the other hand, many of panel parts to be applied to aircrafts have a three-dimensional curved surface shape, and in manufacturing a sandwich panel, a material that can be sufficiently shaped into this three-dimensional shape needs to be selected. In this case, the core material is often selected as an easily-shaped resin foam. Examples of the resin foam having heat resistance include a super engineering plastic foam, such as polymethacrylimide, polyethersulfone, and polyimide.

In using a core material consisting of a resin foam, a material having a high foaming ratio and a low bulk density (for example, 150 kg/m³ or less) is selected to achieve a weight reduction which is an original purpose of a sandwich panel.

Unfortunately, such a core material tends to have a low rigidity due to swelling due to its high void ratio or impregnation of an adhesive resin to be applied, and as a result, a dimensional change (crushing) in a thickness direction is particularly large in a heating and pressurizing step at the time of manufacturing a sandwich panel, causing an extreme thickness change at a level exceeding 50% before and after curing, for example.

SUMMARY

The present technology provides a method of molding a sandwich panel that can reduce a change in thickness before and after curing.

As a result of intensive studies, the present inventors have found improvements by specifying the types of the core material and the skin material, and in particular, by using an epoxy resin having a specific structure or a molecular weight in a specific range as the skin material and have been able to complete the present technology.

An embodiment of the present technology is a method of molding a sandwich panel including a step of providing, on one or both surfaces of an (a) core material, a prepreg or the prepreg and an adhesive as a (b) skin material.

The (a) core material is a super engineering plastic foam having a glass transition temperature of greater than 200° C.

The (b) skin material contains:
   a (b-1) epoxy resin having an average molecular weight of 1300 or more or having a trishydroxymethane-type or cresol novolac-type structure and containing an amount of 70 to 100 mass % of an epoxy resin that is semi-solid or solid at room temperature (23° C.);
   a (b-2) epoxy resin containing an amount of 0 to 30 mass % of an epoxy resin that is liquid at room temperature (23° C.); and
   a (b-3) curing agent.

The method of molding a sandwich panel according to an embodiment of the present technology includes a step of providing, on one or both surfaces of an (a) core material, a prepreg or the prepreg and an adhesive as a (b) skin material, the (a) core material is a super engineering plastic foam having a glass transition temperature of greater than 200° C., and the (b) skin material contains: a (b-1) epoxy resin having an average molecular weight of 1300 or more or having a trishydroxymethane-type or cresol novolac-type structure and containing, in a total epoxy resin, an amount of 70 to 100 mass % of an epoxy resin that is semi-solid or solid at room temperature (23° C.); a (b-2) epoxy resin containing, in the total epoxy resin, an amount of 0 to 30 mass % of an epoxy resin that is liquid at room temperature (23° C.); and a (b-3) curing agent. This can reduce a change in thickness before and after curing and minimize crushing of the core material in a curing step, which has been a known problem, to mold a sandwich panel having a uniform thickness.

In addition, the change in thickness before and after curing is reduced, facilitating the process design and producing an effect of further facilitating the molding jig design.

Since the method of molding a sandwich panel of an embodiment of the present technology, which can use a prepreg or the prepreg and an adhesive as a skin material, can be applied to any of (1) skin material co-curing, (2) pre-cured skin panel adhesion, and (3) metal skin panel adhesion in a panel manufacturing process and can be applied to a wide range of processes.

Here, the (1) skin material co-curing is a method of laminating a prepreg or the prepreg and an adhesive as a skin material in an uncured state on one side or both sides of a core material and then heating, pressurizing, and curing to simultaneously bond the prepreg of the skin material and the skin material to the core material. In this case, the prepreg or the prepreg and the adhesive applied as the skin material are all materials satisfying the condition of the (b). (2) Pre-cured skin panel adhesion is a method of bonding a skin material as an FRP, which is obtained by laminating a prepreg in advance to have a predetermined shape and heating and curing the prepreg, to a core material with an adhesive in a secondary step and then heating and curing the adhesive. In this case, the prepreg applied as the skin material is not limited to a material satisfying the condition of the (b). The adhesive is a material satisfying the condition of the (b). (3) Metal skin panel adhesion is a method of bonding, by using a metal material such as an aluminum plate having a predetermined shape as a skin material, the skin material to a core material with an adhesive and then heating and curing the adhesive. In this case, the adhesive is a material satisfying the condition of the (b).

According to the method of molding a sandwich panel of an embodiment of the present technology, a change in thickness before and after curing is reduced, a uniform thickness and uniform characteristics can be obtained over the entire surface of the panel, and thus the molded sandwich panel is particularly suitable for uses requiring radio wave characteristics.

DETAILED DESCRIPTION

The present technology will be described in further detail below.

Figure 1:
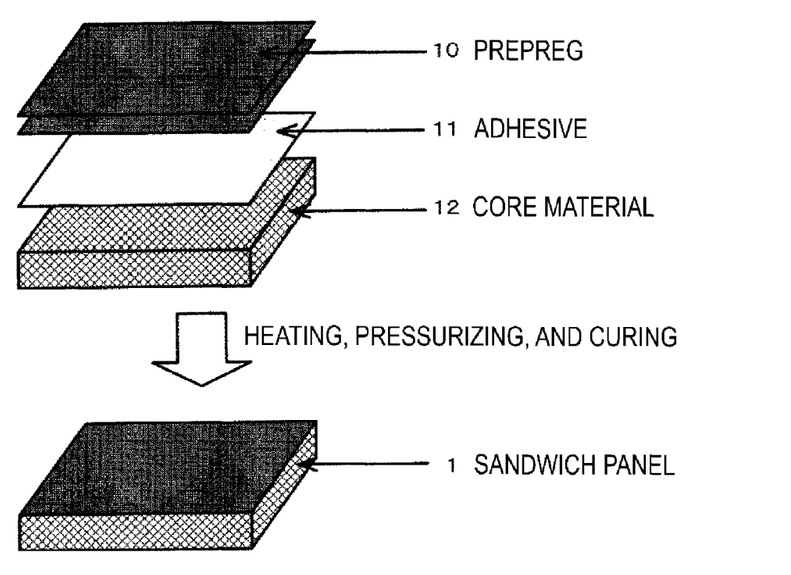
The Drawing is a perspective view schematically illustrating an example of a sandwich panel.

The Drawing is a perspective view schematically illustrating an example of a sandwich panel and materials that constitute the sandwich panel.

In the Drawing, a sandwich panel 1 has a structure obtained by bonding a skin material 10 laminated in two layers onto a core material 12 with an adhesive 11 and heating, pressurizing, and curing the resultant materials. In the embodiment of the Drawing, the core material 12 is a super engineering plastic foam and the skin material 10 has the form of a prepreg. As described below, the adhesive 11 is, for example, a liquid adhesive having a viscosity that enables application or bonding at room temperature (23° C.) or a film-like adhesive. When the amount of a resin formulation contained in the prepreg 10 used here is sufficient for adhesion to the core material 12, the adhesive 11 is not necessarily used.

(a) Core Material

The (a) core material used in an embodiment of the present technology consists of a super engineering plastic foam having a glass transition temperature of more than 200° C.

As the super engineering plastic, known super engineering plastics can be used without limitation, and examples thereof include polymethacrylimide, polyethersulfone, and polyimide. Polyethersulfone (PES) is particularly preferable from the perspective of having excellent formability and further reducing a change in thickness before and after curing.

The bulk density of the super engineering plastic foam is preferably 150 kg/m$^3$ or less, more preferably 60 to 140 kg/m$^3$, from the perspective of weight reduction.

The bulk density can be easily measured by weighing a core material cut into a shape easy to measure in size (for example, a cube having a width of 100 mm, a length of 100 mm, and a height of 100 mm) with an electronic balance or the like, and dividing the value by the volume calculated from the dimensions of the cut core material.

The thickness of the (a) core material between the skin materials (b) can be set as desired in accordance with the shape requirements of the applied component, and is 3 mm to 25 mm, for example.

It is necessary that the super engineering plastic in the core material (a) should have a glass transition temperature of more than 200° C. In general, plastics tend to be subjected to a decrease in resin rigidity from a temperature region lower than the glass transition temperature by about 50° C. Therefore, when a product to which the present technology is applied is required to have a heat resistance of 150° C. or higher, for example, the glass transition temperature of the material is desirably 200° C. or higher. The glass transition temperature referred to herein was determined by thermomechanical analysis (TMA analysis) at a heating rate of 10° C./min. In the thermomechanical analysis, a thermomechanical analyzer TMA-4000S manufactured by Bruker AXS was used for measurement in an expansion mode.

(b) Skin Material

The (b) skin material used in an embodiment of the present technology is a prepreg or the prepreg and an adhesive containing a resin containing: a (b-1) epoxy resin having an average molecular weight of 1300 or more or a trishydroxymethane-type or cresol novolac-type structure and containing, in a total epoxy resin, an amount of 70 to 100 mass % of an epoxy resin that is semi-solid or solid at room temperature (23° C.); a (b-2) epoxy resin containing, in the total epoxy resin, an amount of 0 to 30 mass % of an epoxy resin that is liquid at room temperature (23° C.); and a (b-3) curing agent.

It is essential that the (b-1) component should be an epoxy resin having an average molecular weight of 1300 or more or having a trishydroxyphenylmethane-type or orthocresol novolac-type structure. The epoxy resin satisfying this condition may be used alone or in combination. When an epoxy resin having a trishydroxyphenylmethane-type or orthocresol novolac-type structure is used, the epoxy resin can be used without any problem even if the average molecular weight is less than 1300.

Examples of the epoxy resin having an average molecular weight of 1300 or more include, as bifunctional epoxy resins, epoxy compounds having bisphenol groups, such as bisphenol A type, bisphenol F type, brominated bisphenol A type, bisphenol S type, bisphenol AF type, and biphenyl type; polyalkylene glycol-type and alkylene glycol-type epoxy compounds; epoxy compounds having naphthalene rings; and epoxy compounds having fluorene groups.

Examples of tri- or higher functional epoxy resins include polyfunctional-type glycidyl ether epoxy resins such as phenol novolac type, orthocresol novolac type, trishydroxyphenylmethane type, and tetraphenylolethane type.

Among them, the (b-1) epoxy resin preferably has a trishydroxyphenylmethane-type structure or an orthocresol novolac-type structure, from the perspective of improving the effects of the present technology.

When the (b-1) component is selected based on the molecular weight, the average molecular weight is preferably 1300 to 4000, and more preferably 1800 to 2500 in view of handleability at the time of blending. The average molecular weight means a weight average molecular weight measured by a GPC method (in terms of polystyrene).

The (b-1) component is an epoxy resin which is semi-solid or solid at room temperature (23° C.), and the semi-solid or solid state specifically means that the component hardly exhibits fluidity at room temperature (23° C.) and has such properties that the viscosity at room temperature cannot be measured.

The (b-2) component is an epoxy resin that is liquid at room temperature (23° C.). Specific examples of the (b-2) component include, in addition to the epoxy resin described in relation to the (b-1) component, aromatic epoxy resins having a glycidylamino group such as N,N,N',N'-tetraglycidyldiaminodiphenylmethane (TGDDM), tetraglycidyl-m-xylylenediamine, triglycidyl-p-aminophenol, and N,N-diglycidylaniline; urethane-modified epoxy resins having a urethane bond; and rubber-modified epoxy resins containing polybutadiene, liquid polyacrylonitrile-butadiene rubber, or acrylonitrile-butadiene rubber (NBR), regardless of the average molecular weight. The (b-2) epoxy resin has a viscosity of 2000 mPa·s or more and preferably has a viscosity of 4000 to 30000 mPa·s at room temperature (23° C.) from the perspective of handleability.

The (b-2) component is an epoxy resin that is liquid at room temperature (23° C.), and the liquid state specifically means that the component has fluidity at room temperature (23° C.).

The (b-3) curing agent is not limited as long as it can be used for epoxy resins.

Examples of the curing agent include amine-based compounds such as 3,3'-diaminodiphenylsulfone, 4,4'-diaminodiphenylsulfone, imidazole compounds, and tetramethylguanidine; thiourea added amine; polyamide; polyol; polymercaptan; polycarboxylic acid; acid anhydride; carboxylic acid hydrazide; carboxylic acid amide; polyphenol compounds; novolak resins; and latent curing agents (e.g., ketimine and dicyandiamide).

A single curing agent can be used or a combination of two or more curing agents can be used.

The (b-3) curing agent is preferably a latent curing agent that can cure epoxy resins by heating at 100° C. or more.

The (b) skin material contains:
a (b-1) epoxy resin having an average molecular weight of 1300 or more or having a trishydroxymethane-type or cresol novolac-type structure and containing, in a total epoxy resin, an amount of 70 to 100 mass % of an epoxy resin that is semi-solid or solid at room temperature (23° C.);
a (b-2) epoxy resin containing, in the total epoxy resin, an amount of 0 to 30 mass % of an epoxy resin that is liquid at room temperature (23° C.); and
a (b-3) curing agent.

In a preferable embodiment, the (b) skin material contains:
a (b-1) epoxy resin having an average molecular weight of 1300 or more or having a trishydroxymethane-type or cresol novolac-type structure and containing, in a total epoxy resin, an amount of 75 to 95 mass % of an epoxy resin that is semi-solid or solid at room temperature (23° C.);
a (b-2) epoxy resin containing, in the total epoxy resin, an amount of 5 to 25 mass % of an epoxy resin that is liquid at room temperature (23° C.); and
a (b-3) curing agent.

A conventionally known additive may be added to the (b) skin material. Examples of the additive include thermoplastic resins, ureas, curing catalysts such as boron trifluoride/amine salt catalysts, fillers, anti-aging agents, flame retardants, reaction retarders, antioxidants, pigments (dyes), plasticizers, thixotropic agents, UV (ultraviolet) absorbents, surfactants (including leveling agents), dispersing agents, dewatering agents, adhesion promoters, and anti-static agents.

The (b) skin material according to an embodiment of the present technology may take the form of an adhesive or a prepreg.

In the form of an adhesive, the (b) skin material is preferably a liquid adhesive or a film-like adhesive having a viscosity of 10000 mPa·s or more at room temperature (23° C.) from the perspective of handleability.

On the other hand, in the form of a prepreg, the (b-1) to (b-3) components are used as a matrix, and the matrix is impregnated with a fiber such as a glass fiber, a silica fiber, a quartz fiber, a carbon fiber, or an aramid fiber. The form of these fibers is not limited to particular forms, and examples thereof include roving, rovings arranged in one direction, fabric, nonwoven fabric, knitted fabric, and tulle and, in particular, is preferably woven fabric. The content of the fibers in the prepreg is preferably from 40 to 70 mass %, from the perspective of mechanical characteristics of the resulting fiber-reinforced composite material.

In the (b) skin material according to an embodiment of the present technology, the prepreg can be directly bonded to the (a) core material without an adhesive and be cured.

A method for manufacturing a prepreg in the present technology is not limited to particular methods. Examples of the method include dipping methods using a solvent and hot melt methods (solvent-free methods). The number of sheets to be applied when the (b) skin material is a prepreg or a film adhesive or the amount to be applied when the (b) skin material is a liquid adhesive is not limited and may be variously determined in accordance with the intended use.

The sandwich panel according to an embodiment of the present technology can be heated and cured by using an autoclave or a hot press. When the (b) skin material is heated and cured under curing conditions of 120° C., 1.5 hours, and 0.3 MPa, the (a) core material has a thickness reduction rate (crushing rate) of preferably 10% or less, more preferably 5% or less. The crushing rate means a rate of reduction in the thickness of the (a) core material after heating and curing with respect to the thickness of the (a) core material before heating and curing.

An intended use of the sandwich panel obtained by the molding method of an embodiment of the present technology is not limited to a particular use. Examples of the intended use include aircraft parts (e.g., radomes, fairings, flaps, leading edges, floor panels, propellers, and fuselages); two-wheel vehicle parts (e.g., motorcycle frames, cowls, and fenders); automobile parts (e.g., doors, bonnets, tailgates, side fenders, side panels, fenders, energy absorbers, trunk lids, hard tops, side mirror covers, spoilers, diffusers, ski carriers, engine cylinder covers, engine hoods, chassis, air spoilers, and propeller shafts); vehicle exterior plating (e.g., lead car noses, roofs, side panels, doors, truck bed covers, and side skirts); railroad vehicle parts (e.g., luggage racks, and seats); aero parts (e.g., side skirts and the like mounted on automobiles and rigid vehicles such as interior design elements, inner panels, outer panels, roofs, and floors of wings on wing trucks); use as housings (e.g., notebook computers, and portable phones); medical uses (e.g., X-ray cassettes, and table tops); audio product uses (e.g., flat speaker panels, and speaker cones); sports goods uses (e.g., golf club heads, face masks, snowboards, surf boards, and protectors); and general industrial uses (e.g., flat springs, windmill blades, and elevators (compartment panels, doors).

Among the above, the sandwich panel obtained by the molding method of an embodiment of the present technology reduces a change in thickness before and after curing, can obtain uniform thickness and characteristics over the entire panel surface, is thus useful for uses requiring radio wave characteristics, and is particularly preferably used for radomes. The radomes, also referred to as radar domes, are radio-transparent windows in aircraft technology and telecommunication fields.

EXAMPLE

The present technology will be described in further detail by way of examples and comparative examples, but the present technology is not limited by these examples.

(1) Verification of Change in Thickness of Core Material Due to Epoxy Resin (Examples 1 to 7 and Comparative Examples 1 to 4)

In an embodiment of the present technology, the epoxy resin component is the most important element for controlling the change in the thickness of the core material, and thus a resin containing only the epoxy resins (b-1) and (b-2) was applied onto the core and then subjected to the heating and pressurizing conditions indicated above to verify the amount of change in the thickness of the core material before and after heating and pressurizing.

In the examples and comparative examples, the following materials were used.

(a) Core Material

Polyethersulfone (PES) foam having a density of 50 kg/m$^3$ (Divinycell F50 manufactured by DIAB, glass transition temperature of 220° C.)

(b) Skin Material (b-1) Component

Trishydroxymethane epoxy resin (HP-7250 manufactured by DIC Corporation, average molecular weight of 500, semi-solid at room temperature)

Phenol novolac-type epoxy resin (Epikote 154 manufactured by Mitsubishi Chemical Corporation, average molecular weight: 600, semi-solid at room temperature)

Cresol novolac epoxy resin (CNE-220HH manufactured by Chang Chun Plastics Co., Ltd., average molecular weight: 1700, solid at room temperature)

Bisphenol A-type epoxy resin (YD-011 manufactured by Nippon Steel Chemical & Material Co., Ltd., average molecular weight: 950, solid at room temperature)

Bisphenol A-type epoxy resin (YD-012 manufactured by Nippon Steel Chemical & Material Co., Ltd., average molecular weight: 1300, solid at room temperature)

Bisphenol A-type epoxy resin (YD-014 manufactured by Nippon Steel Chemical & Material Co., Ltd., average molecular weight: 1880, solid at room temperature)

Bisphenol A-type epoxy resin (YD-017 manufactured by Nippon Steel Chemical & Material Co., Ltd., average molecular weight: 3700, solid at room temperature)

(b-2) Component

TG-DDM-type epoxy resin (YH-404 manufactured by Nippon Steel Chemical & Material Co., Ltd., liquid at room temperature)

Bisphenol A-type epoxy resin (YD-128 manufactured by Nippon Steel Chemical & Material Co., Ltd., liquid at room temperature)

According to the blending proportions (parts by mass) listed in Table 1 below, the materials were kneaded by using a kneader, and thus epoxy resin (b-1) and (b-2) compositions were prepared.

Next, the prepared epoxy resin (b-1) and (b-2) compositions were applied in the application amounts indicated in the following Table 1 to the surfaces of the core materials (a) cut into flat plates having a width of 100 mm, a length of 100 mm, and a thickness of about 6 mm, and then heated and pressurized by a hot press at 120° C. and 0.3 MPa for 1.5 hours to verify the changes in the thicknesses of the core materials before and after heating and pressurizing.

For each (a) core material coated with the epoxy resin (b-1) and (b-2) compositions, the thickness reduction rate (crushing rate) was calculated by measuring the thickness of the core material before and after heating and pressurizing. The results are shown in Table 1.

TABLE 1

Evaluation of variation in core thickness due to epoxy resin component alone

| | Component | | Average molecular weight | Properties at room temperature | Softening point/melting point |
|---|---|---|---|---|---|
| (b-1) Epoxy resin which is semi-solid or solid at room temperature | HP-7250 | Trishydroxymethane epoxy resin | 500 | Solid to semi-solid | 51 |
| | ESCN220HH | Cresol novolac epoxy resin | 1700 | Solid | 88 |
| | Epikote 154 | Phenol novolac epoxy resin | 600 | Semi-solid | (*1) |
| | YD-011 | Solid bisphenol A-type epoxy resin | 950 | Solid to semi-solid | 60 |
| | YD-012 | Solid bisphenol A-type epoxy resin | 1300 | Solid | 80 |
| | YD-014 | Solid bisphenol A-type epoxy resin | 1880 | Solid | 91 |
| | YD-017 | Solid bisphenol A-type epoxy resin | 3700 | Solid | 117 |
| (b-2) Epoxy resin which is liquid at room temperature | YH-404 | TG-DDM-type epoxy resin | 440 | Liquid | |
| | YD-128 | Bisphenol A-type epoxy resin | 380 | | |
| (b-3) Curing agent | Seikacure S | 4,4'-Diaminodiphenylsulfone | | | |
| | DICY-15 | Dicyandiamide | | | |
| | OMICURE 24 | Urea | | | |
| (a) Core material | Divinycell F50 | PES (50 kg/m$^3$) | | | |
| Application amount | | g/m$^2$ | | | |
| Thickness of molded product | Before heating | mm | | | |
| | After heating | mm | | | |
| Thickness reduction rate | | % | | | |

TABLE 1-continued

Evaluation of variation in core thickness due to epoxy resin component alone

| Component | | | Example 1 | Example 2 | Example 3 | Example 4 |
|---|---|---|---|---|---|---|
| (b-1) Epoxy resin which is semi-solid or solid at room temperature | HP-7250 | Trishydroxymethane epoxy resin | 100 | 80 | | |
| | ESCN220HH | Cresol novolac epoxy resin | | | 80 | 80 |
| | Epikote 154 | Phenol novolac epoxy resin | | | | |
| | YD-011 | Solid bisphenol A-type epoxy resin | | | | |
| | YD-012 | Solid bisphenol A-type epoxy resin | | | | |
| | YD-014 | Solid bisphenol A-type epoxy resin | | | | |
| | YD-017 | Solid bisphenol A-type epoxy resin | | | | |
| (b-2) Epoxy resin which is liquid at room temperature | YH-404 | TG-DDM-type epoxy resin | | 20 | 20 | |
| | YD-128 | Bisphenol A-type epoxy resin | | | | 20 |
| (b-3) Curing agent | Seikacure S | 4,4'-Diaminodiphenylsulfone | | | | |
| | DICY-15 | Dicyandiamide | | | | |
| | OMICURE 24 | Urea | | | | |
| (a) Core material | Divinycell F50 | PES (50 kg/m$^3$) | Yes | Yes | Yes | Yes |
| Application amount | | g/m$^2$ | 100 | 170 | 170 | 170 |
| Thickness of molded product | Before heating | mm | 6.04 | 6.06 | 6.13 | 6.13 |
| | After heating | mm | 5.91 | 5.58 | 5.81 | 5.61 |
| Thickness reduction rate | | % | 2.2% | 7.9% | 5.2% | 8.5% |

| Component | | | Example 5 | Example 6 | Example 7 |
|---|---|---|---|---|---|
| (b-1) Epoxy resin which is semi-solid or solid at room temperature | HP-7250 | Trishydroxymethane epoxy resin | | | |
| | ESCN220HH | Cresol novolac epoxy resin | | | |
| | Epikote 154 | Phenol novolac epoxy resin | | | |
| | YD-011 | Solid bisphenol A-type epoxy resin | | | |
| | YD-012 | Solid bisphenol A-type epoxy resin | 80 | | |
| | YD-014 | Solid bisphenol A-type epoxy resin | | 80 | |
| | YD-017 | Solid bisphenol A-type epoxy resin | | | 80 |
| (b-2) Epoxy resin which is liquid at room temperature | YH-404 | TG-DDM-type epoxy resin | 20 | 20 | |
| | YD-128 | Bisphenol A-type epoxy resin | | | 20 |
| (b-3) Curing agent | Seikacure S | 4,4'-Diaminodiphenylsulfone | | | |
| | DICY-15 | Dicyandiamide | | | |
| | OMICURE 24 | Urea | | | |
| (a) Core material | Divinycell F50 | PES (50 kg/m$^3$) | Yes | Yes | Yes |
| Application amount | | g/m$^2$ | 170 | 170 | 170 |
| Thickness of molded product | Before heating | mm | 6.31 | 6.13 | 6.13 |
| | After heating | mm | 5.70 | 5.86 | 5.82 |
| Thickness reduction rate | | % | 9.7% | 4.4% | 5.1% |

| Component | | | Comparative Example 1 | Comparative Example 2 | Comparative Example 3 | Comparative Example 4 |
|---|---|---|---|---|---|---|
| (b-1) Epoxy resin which is semi-solid or solid at room temperature | HP-7250 | Trishydroxymethane epoxy resin | | | | |
| | ESCN220HH | Cresol novolac epoxy resin | | | | |
| | Epikote 154 | Phenol novolac epoxy resin | 100 | | | |
| | YD-011 | Solid bisphenol A-type epoxy resin | | | | 80 |
| | YD-012 | Solid bisphenol A-type epoxy resin | | | | |
| | YD-014 | Solid bisphenol A-type epoxy resin | | | | |
| | YD-017 | Solid bisphenol A-type epoxy resin | | | | |

TABLE 1-continued

Evaluation of variation in core thickness due to epoxy resin component alone

| | | | | | | |
|---|---|---|---|---|---|---|
| (b-2) Epoxy resin which is liquid at room temperature | YH-404 | TG-DDM-type epoxy resin | 100 | | | |
| | YD-128 | Bisphenol A-type epoxy resin | | 100 | | 20 |
| (b-3) Curing agent | Seikacure S | 4,4'-Diaminodiphenylsulfone | | | | |
| | DICY-15 | Dicyandiamide | | | | |
| | OMICURE 24 | Urea | | | | |
| (a) Core material | Divinycell F50 | PES (50 kg/m³) | Yes | Yes | Yes | Yes |
| Application amount | | g/m² | 100 | 100 | 100 | 170 |
| Thickness of molded product | Before heating | mm | 6.11 | 6.07 | 6.04 | 6.13 |
| | After heating | mm | 1.19 | 3.32 | 0.60 | 4.01 |
| Thickness reduction rate | | % | 80.5% | 45.3% | 90.1% | 34.6% |

*1: Clear softening point or melting point was not detected.

The results of Table 1 show that the molded articles of the examples exhibited a low crushing rate, whereas the molded articles of Comparative Examples 1 to 4 exhibited a degraded crushing rate since the (b-1) component was not added.

(2) Verification of Change in Thickness of Core Material Due to Adhesive Composition for Skin Material (Examples 8 to 10 and Comparative Examples 5 and 6)

Based on the verification results of the epoxy resin formulations indicated above, adhesive resin formulations in which the curing agent component (b-3) was blended with a resin in which only the epoxy resins (b-1) and (b-2) were blended were prepared, and applied onto the core and heated and cured to verify the amount of change in the thickness of the core material before and after curing.

In the examples and comparative examples, the following materials were used.
(a) Core Material
Polyethersulfone (PES) foam having a density of 50 kg/m³ (Divinycell F50 manufactured by DIAB, glass transition temperature of 220° C.)
(b) Skin Material
(b-1) Component
Trishydroxymethane epoxy resin (HP-7250 manufactured by DIC Corporation, average molecular weight of 500, semi-solid at room temperature)
Cresol novolac epoxy resin (CNE-220HH manufactured by Chang Chun Plastics Co., Ltd., average molecular weight: 1700, solid at room temperature)
Bisphenol A-type epoxy resin (YD-012 manufactured by Nippon Steel Chemical & Material Co., Ltd., average molecular weight: 1300, solid at room temperature)
(b-2) Component
TG-DDM-type epoxy resin (YH-404 manufactured by Nippon Steel Chemical & Material Co., Ltd., liquid at room temperature)
Bisphenol A-type epoxy resin (YD-128 manufactured by Nippon Steel Chemical & Material Co., Ltd., liquid at room temperature)
(b-3) Component
4,4'-diaminodiphenylsulfone (SEIKACURE S manufactured by Seika Corporation)
Dicyandiamide (Dicy-15 manufactured by Mitsubishi Chemical Corporation)
Urea (OMICURE 24 manufactured by CVC Thermoset Specialties)
According to the blending proportions (parts by mass) listed in Table 2 below, the materials were kneaded by using a kneader, and thus an adhesive resin composition for (b) skin material was prepared.

Next, the prepared adhesive resin composition for (b) skin material was applied in the application amounts indicated in the following Table 1 to the surfaces of the (a) core material cut into flat plates having a width of 100 mm, a length of 100 mm, and a thickness of about 6 mm, and then heated and pressurized by a hot press at 120° C. and 0.3 MPa for 1.5 hours to verify the changes in the thicknesses of the core materials before and after heating.

For each (a) core material coated with the adhesive resin composition for (b) skin material, the thickness reduction rate (crushing rate) was calculated by measuring the thickness of the core material before and after heating and pressurizing. The results are shown in Table 2.

TABLE 2

Evaluation of variation in core thickness due to adhesive formulation

| | | Component | Average Molecular Weight | Properties at room temperature |
|---|---|---|---|---|
| (b-1) Epoxy resin which is semi-solid or solid at room temperature | HP-7250 | Trishydroxymethane epoxy resin | 500 | Solid to semi-solid |
| | ESCN220HH | Cresol novolac epoxy resin | 1700 | Solid |
| | YD-012 | Solid bisphenol A-type epoxy resin | 1300 | Solid |
| (b-2) Epoxy resin which is liquid at room temperature | YH-404 | TG-DDM-type epoxy resin | 440 | Liquid |
| | YD-128 | Bisphenol A-type epoxy resin | 380 | |

TABLE 2-continued

Evaluation of variation in core thickness due to adhesive formulation

| | | | | | |
|---|---|---|---|---|---|
| (b-3) Curing agent | Seikacure S | 4,4'-Diaminodiphenylsulfone | | | |
| | DICY-15 | Dicyandiamide | | | |
| | OMICURE 24 | Urea | | | |
| (a) Core material | Divinycell F50 | PES | | | |
| Application amount | | g/m² | | | |
| Thickness of molded product | Before heating | mm | | | |
| | After heating | mm | | | |
| Thickness reduction rate | | % | | | |

| Component | | | Example 8 | Example 9 | Example 10 |
|---|---|---|---|---|---|
| (b-1) Epoxy resin which is semi-solid or solid at room temperature | HP-7250 | Trishydroxymethane epoxy resin | 80 | 70 | |
| | ESCN220HH | Cresol novolac epoxy resin | | | |
| | YD-012 | Solid bisphenol A-type epoxy resin | | | 80 |
| (b-2) Epoxy resin which is liquid at room temperature | YH-404 | TG-DDM-type epoxy resin | 20 | 30 | 20 |
| | YD-128 | Bisphenol A-type epoxy resin | | | |
| (b-3) Curing agent | Seikacure S | 4,4'-Diaminodiphenylsulfone | 12.6 | 13.1 | 3.3 |
| | DICY-15 | Dicyandiamide | 2 | 2 | 2 |
| | OMICURE 24 | Urea | 2 | 2 | 2 |
| (a) Core material | Divinycell F50 | PES | Yes | Yes | Yes |
| Application amount | | g/m² | 170 | 170 | 170 |
| Thickness of molded product | Before heating | mm | 6.15 | 6.02 | 6.36 |
| | After heating | mm | 5.9 | 5.78 | 5.9 |
| Thickness reduction rate | | % | 4.1% | 4.0% | 7.2% |

| Component | | | Comparative Example 5 | Comparative Example 6 |
|---|---|---|---|---|
| (b-1) Epoxy resin which is semi-solid or solid at room temperature | HP-7250 | Trishydroxymethane epoxy resin | 60 | |
| | ESCN220HH | Cresol novolac epoxy resin | | 60 |
| | YD-012 | Solid bisphenol A-type epoxy resin | | |
| (b-2) Epoxy resin which is liquid at room temperature | YH-404 | TG-DDM-type epoxy resin | 40 | |
| | YD-128 | Bisphenol A-type epoxy resin | | 40 |
| (b-3) Curing agent | Seikacure S | 4,4'-Diaminodiphenylsulfone | 13.6 | 9.9 |
| | DICY-15 | Dicyandiamide | 2 | 2 |
| | OMICURE 24 | Urea | 2 | 2 |
| (a) Core material | Divinycell F50 | PES | Yes | Yes |
| Application amount | | g/m² | 170 | 170 |
| Thickness of molded product | Before heating | mm | 6.13 | 6.21 |
| | After heating | mm | 5.48 | 4.86 |
| Thickness reduction rate | | % | 10.6% | 21.7% |

The results of Table 2 show that the molded articles of the examples exhibited a low crushing rate, whereas the molded articles of Comparative Examples 5 and 6 exhibited a degraded crushing rate since the blending amount of the (b-1) component was less than the lower limit defined in the present technology.

The invention claimed is:

1. A method of molding a sandwich panel, the method comprising a step of providing, on one or both surfaces of an (a) core material, a prepreg as a (b) skin material, the (a) core material being a super engineering plastic foam having a glass transition temperature of greater than 200° C., and the (b) skin material containing:

a (b-1) epoxy resin having an average molecular weight of 1300 or more or having a trishydroxymethane-type or cresol novolac-type structure and containing, in a total epoxy resin, an amount of 70 to 100 mass % of an epoxy resin that is semi-solid or solid at room temperature (23° C.);

a (b-2) epoxy resin containing, in the total epoxy resin, an amount of 0 to 30 mass % of an epoxy resin that is liquid at room temperature (23° C.); and a (b-3) curing agent; wherein the prepreg as the (b) skin material is a self-adhesive material which is directly bonded to the (a) core material without an adhesive and which is cured.

2. The method of molding a sandwich panel according to claim 1, wherein the super engineering plastic foam is a polyethersulfone (PES) foam.

3. The method of molding a sandwich panel according to claim 1, wherein the super engineering plastic foam has a bulk density of 150 kg/m$^3$ or less.

4. The method of molding a sandwich panel according to claim 3, wherein the super engineering plastic foam has a bulk density of 60 to 140 kg/m$^3$.

5. The method of molding a sandwich panel according to claim 1, wherein the step of providing, on one or both surfaces of the (a) core material, the prepreg as the (b) skin material comprises a step of heating and curing the (b) skin material; and the (a) core material has a thickness reduction rate (crushing rate) of 10% or less when conditions of the heating and curing are 120° C., 1.5 hours, and 0.3 MPa or more.

6. The method of molding a sandwich panel according to claim 1, wherein the (b-1) epoxy resin has a trishydroxymethane-type or cresol novolac-type structure.

7. The method of molding a sandwich panel according to claim 1, wherein the (b-2) epoxy resin has a viscosity of 2000 mPa·s or more at room temperature (23° C.).

8. The method of molding a sandwich panel according to claim 1, wherein the (b-2) epoxy resin has a content of 5 to 25 mass % in the total epoxy resin.

9. The method of molding a sandwich panel according to claim 1, wherein the prepreg as the (b) skin material is a prepreg that uses woven fabric made of a glass fiber, a silica fiber, a quartz fiber, a carbon fiber, or an aramid fiber.

\* \* \* \* \*